United States Patent
Yamano et al.

(10) Patent No.: US 7,898,465 B2
(45) Date of Patent: Mar. 1, 2011

(54) ELECTRONICALLY SCANNED RADAR SYSTEM AND RECEIVING ANTENNA

(75) Inventors: Chiharu Yamano, Tokyo (JP); Yasushi Sakuma, Oobu (JP); Kento Nakabayashi, Anjo (JP); Kazuma Natsume, Oobu (JP)

(73) Assignee: Denso Corporation, Kariya (JP)

( * ) Notice: Subject to any disclaimer, the term of this patent is extended or adjusted under 35 U.S.C. 154(b) by 53 days.

(21) Appl. No.: 12/524,672

(22) PCT Filed: Feb. 27, 2008

(86) PCT No.: PCT/JP2008/053412

§ 371 (c)(1),
(2), (4) Date: Jul. 27, 2009

(87) PCT Pub. No.: WO2008/105458

PCT Pub. Date: Sep. 4, 2008

(65) Prior Publication Data

US 2010/0045507 A1 Feb. 25, 2010

(30) Foreign Application Priority Data

Feb. 28, 2007 (JP) .............................. 2007-049083
Feb. 26, 2008 (JP) .............................. 2008-045017

(51) Int. Cl.
*G01S 13/42* (2006.01)
*G01S 13/93* (2006.01)

(52) U.S. Cl. ........................................ 342/70; 342/107

(58) Field of Classification Search ............. 342/70–72, 342/74, 81, 107, 368, 371–372, 445, 446
See application file for complete search history.

(56) References Cited

U.S. PATENT DOCUMENTS

| | | | | |
|---|---|---|---|---|
| 4,257,050 A | * | 3/1981 | Ploussios | 342/372 |
| 4,626,858 A | * | 12/1986 | Copeland | 342/374 |
| 4,912,481 A | * | 3/1990 | Mace et al. | 343/700 MS |
| 5,565,873 A | * | 10/1996 | Dean | 342/372 |
| 5,657,022 A | * | 8/1997 | Van Etten et al. | 342/104 |

(Continued)

FOREIGN PATENT DOCUMENTS

| JP | 10-253730 A | 9/1998 |
|---|---|---|
| JP | 2005-257384 A2 | 9/2005 |
| JP | 2008241702 A * | 10/2008 |

OTHER PUBLICATIONS

Toshiyuki Nakazawa et al., "Futokankaku Array o Mochiita Hoi Suitei ni Okeru Ambiguity no Jokyo," IEICE Technical Report, Jan. 21, 2000, vol. 99, No. 571, pp. 39 to 46.

(Continued)

*Primary Examiner* — John B Sotomayor
(74) *Attorney, Agent, or Firm* — Harness, Dickey & Pierce, PLC

(57) ABSTRACT

A plurality of array antenna elements are divided in terms of a set constituted of an optionally selected L number of groups. The spaces between the array antenna elements are determined by obtaining a greatest common divisor of the set as a greatest common divisor of inter-group element spaces, the set having, as components, greatest common divisors of inter-element spaces of the individual L number of groups in the set, obtaining a greatest common divisor of inter-group element for every number L equal to or less than the maximum number of incoming waves by changing the number L of group components, and allowing a direction not to be caused in the radar scanning region by a number equal to or more than L+1, on the basis of the greatest common divisor of inter-group element spaces for every number L of group components, the direction being linearly dependent on an incoming wave corresponding to the greatest common divisor of inter-group element spaces.

18 Claims, 7 Drawing Sheets

U.S. PATENT DOCUMENTS

| | | | |
|---|---|---|---|
| 7,495,604 B2* | 2/2009 | Yamano et al. | 342/107 |
| 2009/0015462 A1* | 1/2009 | Nakanishi | 342/107 |
| 2010/0019950 A1* | 1/2010 | Yamano et al. | 342/104 |
| 2010/0045507 A1* | 2/2010 | Yamano et al. | 342/70 |

OTHER PUBLICATIONS

Toshiyuki Nakazawa et al., Futokankaku Array o Mochiita Hoi Suitei, The Transactions of the Institute of Electronics, Information and Communication Engineers B, Jun. 25, 2000, vol. J83-B, No. 6, pp. 845-851.

Mizokami, Osamu et al., "A Study on an Arrangement Spaces for a Non-uniform Array in Suppressing Gratinglobe," Institute of Electronics, Information and Communication Engineers, vol. J83-B No. 1; Jan. 2000; pp. 141-143. (discussed on p. 3 in the specification).

International Preliminary Report on Patentability in corresponding parent PCT Application No. PCT/JP2008/053412 dated Sep. 11, 2009.

* cited by examiner

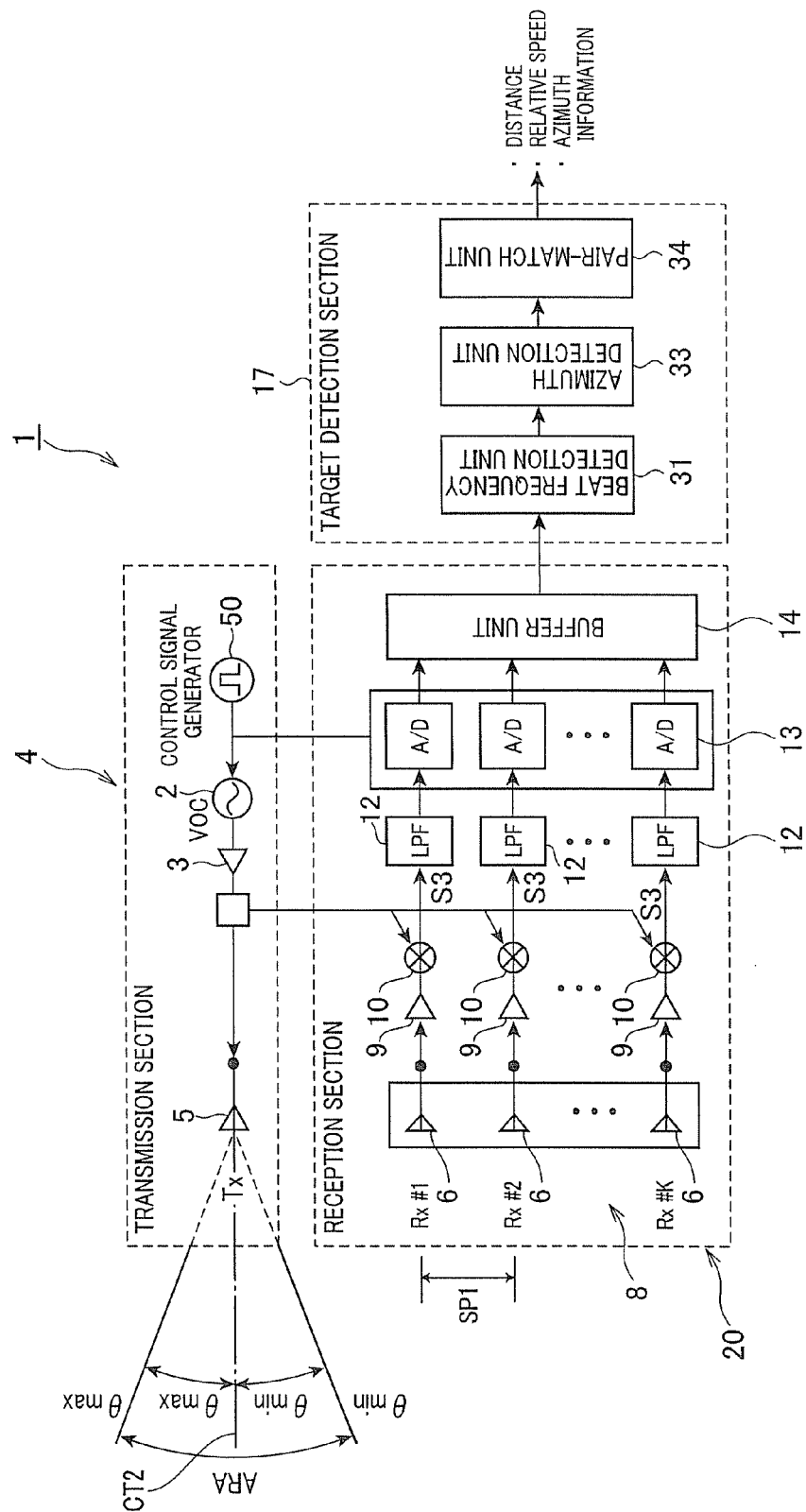

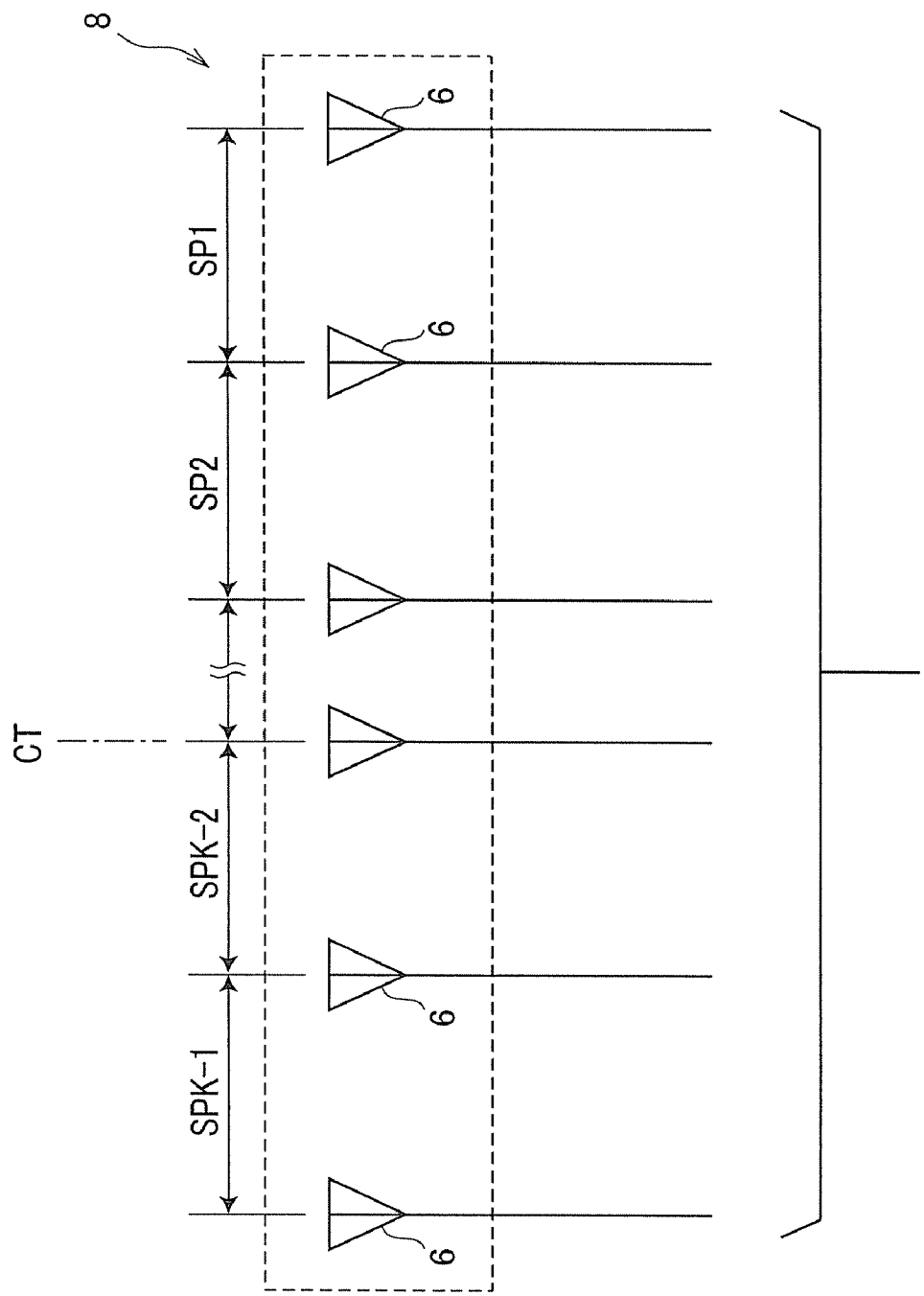

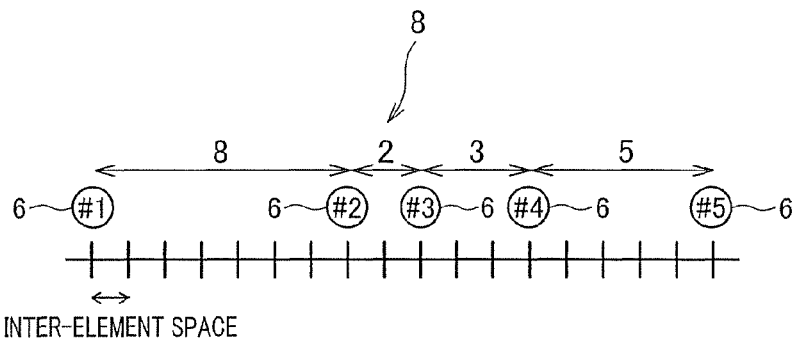

INTER-ELEMENT SPACE
BASIC UNIT : U

⟨ EXAMPLE 1 ⟩
IN THE ABOVE FIGURE, FOR EXAMPLE:
GCD {#2, #4, #5} = 5U
GCD {#1, #3} = 10U
GCD OF INTER-GROUP ELEMENT SPACES = 5U

⟨ EXAMPLE 2 ⟩
GCD {#1, #2, #3} = 2U
GCD {#4, #5} = 5U
GCD OF INTER-GROUP ELEMENT SPACES = 1U

⟨ EXAMPLE 3 ⟩
GCD {#1, #2, #3, #4} = 1U
GCD {#5} = NONE (= 0)
GCD OF INTER-GROUP ELEMENT SPACES = 1U

⟨ EXAMPLE 4 ⟩
EXAMPLE WHERE NUMBER OF INCOMING WAVES
IS 3 AND NUMBER OF GROUPS IS 3
GCD {#2, #4, #5} = 5U
GCD {#1} = NONE (= 0)
GCD {#3} = NONE (= 0)
GCD OF INTER-GROUP ELEMENT SPACES = 5U (b)

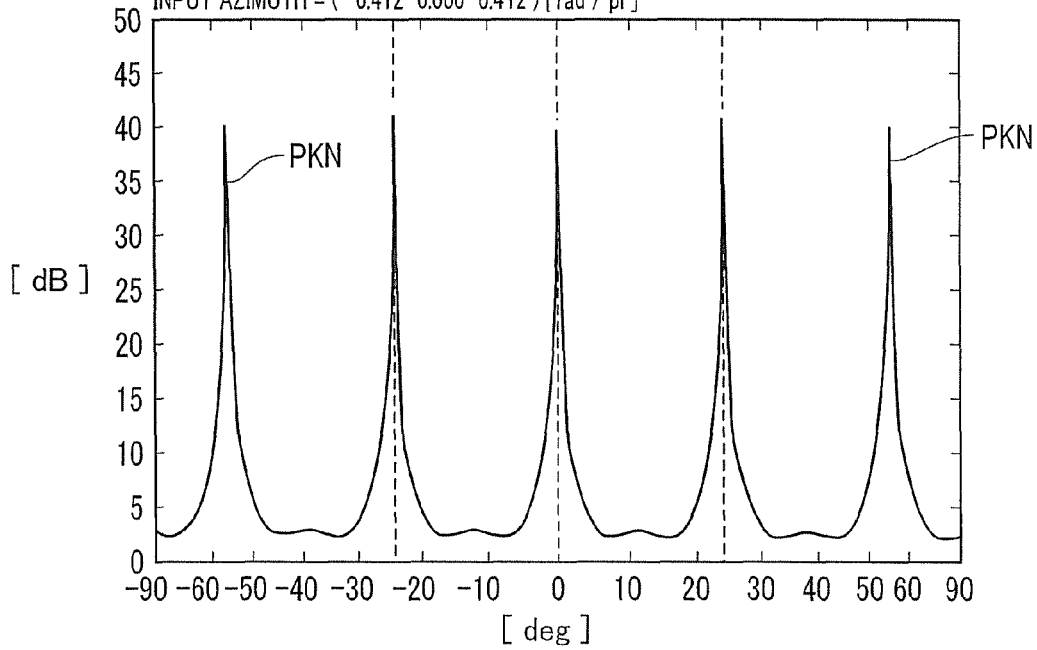

ELECTRONICALLY SCANNED RADAR SYSTEM AND RECEIVING ANTENNA

This application is a 371 U.S. National Stage of International Application No. PCT/JP2008/053412, filed Feb. 27, 2008, which claims priority to Japanese Patent Applications JP 2007-049083 filed Feb. 28, 2007, and JP 2008-045017, filed Feb. 26, 2008. The entire disclosures of the above applications are incorporated herein by reference.

TECHNICAL FIELD

The present invention relates to an electronically scanned radar system, and more particularly, to an on-vehicle electronically scanned radar system and a receiving antenna used for the system.

BACKGROUND ART

On-vehicle radars have been developed, which utilize radio waves of a millimeter waveband, for example, for measuring the distance, speed and azimuth, for example, associated with a forward target, for application to inter-vehicle control or mitigation of collision between vehicles. Recently, radars are required, for example, to track an obliquely forward vehicle as viewed from an own vehicle when passing through a curve at low speed, or detect obstacles near the own vehicle. Under such circumstances, there is a need for radars having an azimuth detection performance which enables monitoring over a wide horizontal range (wide angle). In response to such a demand, electronically scanned radar systems have gradually been adopted, which systems utilize array antennas structured by a plurality of antenna elements.

What is important for monitoring a distanced region is azimuth resolution of a radar. For example, azimuth resolution of several degrees is required in order to dissociate and detect two vehicles traveling alongside some 100 m forward along two respective lanes. Generally, enhancement of the azimuth resolution can be achieved by broadening the aperture of the array antenna. However, broadening the aperture of an array antenna yields a problem of increasing the size of the radar.

Also, in the case where azimuth detection is carried out by digital beam forming (DBF) using an array antenna having uniformly spaced elements, for example, grating lobe may be caused depending on the size of the space between the array antennas used for reception. The grating lobe occurs when the phase of a reception signal is turned by $2n\pi$. Therefore, an angle avoiding an azimuth that may cause the grating lobe is established as an azimuth that enables detection.

For example, as shown in FIG. 1, there may be a case where azimuth detection is performed for a preceding object, or a vehicle 61, by conducting digital beam forming (DBF) with the aid of an array antenna with uniformly spaced elements, which is loaded on a vehicle 60. In this case, as shown in FIG. 6, some peaks are caused by objects that are present on both sides of the road. In particular, a peak PK1 may be caused, which corresponds to a reflected wave S1 that is a reflection from a roadside object 62, a peak PK3 may be caused, which corresponds to a reflected wave S3 that is a reflection from a roadside object 63, and a peak PK2 may be caused, which corresponds to a reflected wave S2 that is a reflection from the vehicle 61. Besides these peaks, grating lobes PKN1, PKN2 and PKN3 may be caused.

The azimuth of causing these grating lobes PKN1, PKN2 and PKN3 is substantially in proportion to the inverse of the antenna space. Accordingly, when DBF is conducted using a uniform array antenna, the grating lobes PKN1, PKN2 and PKN3 can be removed out of the monitoring range (scanning range of the radar) by reducing (narrowing) the antenna space, to thereby broaden the angle of detection.

Being based on this idea, a uniform array antenna having a small space between the antenna elements and a wide antenna aperture may be used to realize an electronically scanned radar of high resolution, which is able to cover a wide horizontal range. However, such an array antenna is not practical because it involves increase in the cost due to the increase of the number of elements, or depression in the gain per antenna element.

Under the circumstances, a suggestion has been made to provide non-uniform spaces between the elements of an array antenna without enlarging the area of the antenna aperture, so that the occurrences of grating lobes can be suppressed and increase in the number of the elements or the size of the radar can be prevented as much as possible.

A technique concerning a method for structuring such a non-uniform array antenna is described, for example, in (Non-patent Document 1). This document suggests a method for providing a configuration in which the spaces between elements are rendered to have a prime number ratio so that the phases of the reception signals are differentiated, while digital beam forming (DBF) is used in performing azimuth detection.

Meanwhile, a high-resolution scheme, such as MUSIC, is known as a subspace method, replacing DBF, for enhancing the azimuth resolution. When a non-uniform array is used, however, in combination with the high-resolution scheme called subspace method, such as MUSIC, it is known that undesired peaks are also produced at azimuths that depend on the spaces between the array antenna elements and the incoming directions of the reception signals, in addition to the azimuths in which grating lobes of DBF occur.

[Non-Patent Document 1]
Paper titled "A Study on an Arrangement Spaces for a Non-uniform Array in Suppressing Gratinglobe", by Osamu MIZOKAMI et al., Institute of Electronics, Information and Communication Engineers, January 2000, Vol. J83-B, No. 1, pp., 141-143

DISCLOSURE OF THE INVENTION

Problems to be Solved by the Invention

However, in the arrangement of the elements of a non-uniform array antenna disclosed in Non-patent Document 1, no consideration is taken as to the undesired peaks that give negative effects when the taken as to the undesired peaks that give negative effects when the high-resolution scheme is used. Therefore, widening the angle of detection cannot be realized in this non-uniform array antenna when the high-resolution scheme is used.

The present invention has as its object to provide a receiving array antenna having a non-uniform array, which is able to provide a wide angle of detection with high azimuth resolution.

Means for Solving the Problems

In order to solve the problem mentioned above, an electronically scanned radar system of claim 1 comprises: a transmitting antenna which is able to freely transmit a transmission signal constituted of a continuous wave in a manner of performing horizontal scanning in a radar scanning region having a minimum angle $\theta_{min}$ and a maximum angle $\theta_{max}$; a receiving antenna constituted of a plurality of array antenna elements which are arranged with predetermined spaces therebetween; mixers for mixing reception signals received by the respective receiving array antenna elements with the transmission signals to obtain beat signals; A/D converters for converting the beat signals of individual channels, which beat signals are obtained by the respective mixers, into digital signals; and a target detection section for detecting a distance to or/and a relative speed of a target on the basis of the reception data, which are the signals digitized by the A/D converter, characterized in that:

spaces in the arrangement, i.e. non-uniform spaces, of the plurality of array antenna elements of the receiving array antenna are set by:

(1) grouping the array antenna elements into two, to express a set encompassing the groups by G(2,p) (where p is a serial number designated to all the conceivable grouping methods);

(2) performing the grouping for every combination of the array antenna elements constituting the receiving array antenna;

(3) obtaining a greatest common divisor as a greatest common divisor $G_{gcd}$ of inter-group element spaces, for a set $\{D_{gcd}(1), D_{gcd}(2)\}$ that has, as components, greatest common divisors of inter-element spaces included in individual groups constituting each set G(2,p); and (4) allowing the greatest common divisor $D_{gcd}$ of inter-group element spaces not to exceed the following formula:

[Mathematical Expression 2]

$$\frac{2 \times \lambda}{\sin(\theta_{max}) - \sin(\theta_{min})}$$

($\lambda$: a wavelength of a reception signal (incoming wave), $\theta_{max}$: a maximum angle of a transmission signal in a horizontal scanning range, and $\theta_{min}$: a minimum angle of a transmission signal in a horizontal scanning range).

As recited in claim 2, an electronically scanned radar system comprises: a transmitting antenna which is able to freely transmit a transmission signal constituted of a continuous wave in a manner of performing horizontal scanning in a radar scanning region having a minimum angle $\theta_{min}$ and a maximum angle $\theta_{max}$; a receiving antenna constituted of a plurality of array antenna elements which are arranged with predetermined spaces therebetween, the receiving antenna being preset with a predetermined number of maximum incoming waves; mixers for mixing reception signals received by the respective receiving array antenna elements with the transmission signals to obtain beat signals; A/D converters for sampling the beat signals of individual channels, which beat signals are obtained by the respective mixers, at a predetermined sampling frequency to obtain reception data; target detection section for detecting a distance to or/and a relative speed of a target using a high-resolution scheme, on the basis of the reception data, which are the data sampled by the A/D converter, characterized in that:

spaces in the arrangement, i.e. non-uniform spaces, of the plurality of array antenna elements of the receiving array antenna are determined by:

(1) grouping the array antenna elements into a predetermined optionally selected natural number L, in respect of the maximum number of incoming waves $L_{max}$ of the receiving array antenna, the natural number being equal to or less than the maximum number of incoming waves $L_{max}$, to express a set of the groups with G(L,p);

(2) performing the grouping for every combination of the array antenna elements constituting the receiving array antenna to obtain a set expressed by:

G(L,p)={g1, ..., gk, ... gL}

(where p is a serial number designated to all the conceivable grouping methods, k is a number designated to each of the groups resulting from the grouping, which is expressed by k=1 ..., gk is a set of element numbers included in a $k^{th}$ group);

(3) obtaining a greatest common divisor as a greatest common divisor $D_{gcd}(G(L,p))$ of inter-group element spaces, for a set $\{D_{gcd}(g1), \ldots, D_{gcd}(gk), \ldots, D_{gcd}(gL)\}$ that has, as components, greatest common divisors of inter-element spaces included in individual groups gk constituting each set G(L,p); and (4) obtaining the greatest common divisor $D_{gcd}(G(L,p))$ of inter-group element spaces for each of the optionally selected natural numbers L, and allowing the greatest common divisor $D_{gcd}(G(L,p))$ of inter-group element spaces not to exceed the following formula:

[Mathematical Expression 4]

$$\frac{\lambda}{\sin(\theta_{max}) - \sin(\theta_{min})} \times L$$

($\lambda$: a wavelength of a reception signal (incoming wave), $\theta_{max}$: a maximum angle of a transmission signal in a horizontal scanning range, $\theta_{min}$: a minimum angle of a transmission signal in a horizontal scanning range, and L: the number of groups corresponding to a greatest common divisor of inter-group element spaces).

As recited in claim 3, an electronically scanned radar system loaded on a vehicle, comprises: a transmitting antenna which is able to freely transmit a transmission signal constituted of a continuous wave in a manner of performing horizontal scanning in a radar scanning region having a minimum angle and a maximum angle; and a receiving antenna constituted of a plurality of array antenna elements which are arranged with predetermined non-uniform spaces therebetween; wherein signals are processed using a high-resolution scheme for reception signals received by the array antenna elements, to detect a distance to a target around an own vehicle or/and a relative speed between the own vehicle and the target, characterized in that:

in the receiving antenna, the spaces in the arrangement of the plurality of array antenna elements constituting the receiving array antenna may be adapted to be determined by:

(1) grouping the array antenna elements into the number of incoming waves L (L is two or more) in respect of the receiving array antenna, to express the resulting sets with G(L, p);

(2) performing the grouping for every combination of the array antenna elements constituting the receiving array antenna to obtain a set expressed by:

G(L,p)={g1, ..., gk, ... gL}

(where p is a serial number designated to all the conceivable grouping methods, k is a number designated to each of the groups resulting from the grouping, which is expressed by k=1 ..., gk is a set of element numbers included in a $k^{th}$ group);

(3) obtaining a greatest common divisor as a greatest common divisor $D_{gcd}(G(L,p))$ of inter-group element spaces, for a set $\{D_{gcd}(g1), \ldots D_{gcd}(gk), \ldots, D_{gcd}(gL)\}$ that has, as components, greatest common divisors of inter-element spaces included in individual groups gk constituting each set $G(L,p)$; and (4) obtaining the greatest common divisor $D_{gcd}(G(L,p))$ of inter-group element spaces for each of the optionally selected natural numbers L, and allowing the greatest common divisor $D_{gcd}(G(L,p))$ of inter-group element spaces not to exceed the following formula:

[Mathematical Expression 4]

$$\frac{\lambda}{\sin(\theta_{max}) - \sin(\theta_{min})} \times L$$

($\lambda$: a wavelength of a reception signal (incoming wave), $\theta_{max}$: a maximum angle of a transmission signal in a horizontal scanning range, and $\theta_{min}$: a minimum angle of a transmission signal in a horizontal scanning and range).

As recited in claim 4, an electronically scanned radar system loaded on a vehicle, comprising: a transmitting antenna which is able to freely transmit a transmission signal constituted of a continuous wave in a manner of performing horizontal scanning in an angle of detection having a minimum angle and a maximum angle; a receiving antenna constituted of a plurality of array antenna elements which are arranged with predetermined spaces therebetween; mixers for mixing reception signals received by the respective receiving array antenna elements with the transmission signals to obtain beat signals; A/D converters for sampling the beat signals of individual channels, which beat signals are obtained by the respective mixers, at a predetermined sampling frequency to obtain reception data; and target detection section for detecting a distance to or/and a relative speed of a target using a high-resolution scheme, on the basis of the reception data, which are the data sampled by the A/D converter, characterized in that:

non-uniform spaces in the arrangement of the plurality of array antenna elements of the receiving array antenna are determined by:

allowing a greatest common divisor of the spaces between the plurality of array antenna elements to be smaller than a wavelength of the reception signal;

obtaining, when the plurality of array antenna elements are grouped in terms of a set constituted of two groups, greatest common divisors of inter-group element spaces with respect to all the groupings, each greatest common divisor of inter-group element spaces being a greatest common divisor of the set having as components greatest common divisors of inter-element spaces for each of two groups constituting the set; and allowing a direction not to be caused in the angle of detection, which direction is linearly dependent on an incoming wave corresponding to the greatest common divisor of inter-group element spaces.

As recited in claim 5, an electronically scanned radar system loaded on a vehicle, comprises: a transmitting antenna which is able to freely transmit a transmission signal constituted of a continuous wave in a manner of performing horizontal scanning in an angle of detection having a predetermined minimum angle and maximum angle; and a receiving antenna constituted of a plurality of array antenna elements which are arranged with predetermined non-uniform spaces therebetween; wherein signals are processed using a high-resolution scheme for reception signals received by the array antenna elements, to detect a distance to a target around an own vehicle or/and a relative speed between the own vehicle and the target, characterized in that:

in an arrangement of the plurality of array antenna elements of the receiving antenna, the spaces in the receiving antenna may be determined by:

obtaining a greatest common divisor of inter-group element spaces as to all groupings obtaining, when the plurality of array antenna elements are grouped in terms of a set constituted of an L number of groups corresponding to an L number of incoming waves, greatest common divisors of inter-group element spaces with respect to all the groupings, each greatest common divisor of inter-group element spaces being a greatest common divisor of the set having, as components, greatest common divisors of inter-element spaces for the L number of groups constituting the set; and allowing the greatest common divisor of inter-group element spaces not to exceed L times the wavelength of the reception signal to prevent production of a false image within each of the angles obtained by dividing the angle of detection into the L number.

As recited in claim 6, it may be advantageous that the set of groups is obtained for every case where L is an integer value of 1 to L to obtain the greatest common divisor of inter-group element spaces based on the greatest common divisors of each of all the sets of groups.

As recited in claim 7, it may also be advantageous that the spaces between the plurality of array antenna elements are set so as to have a prime number ratio when optionally rearranged.

As recited in claim 8, it may also be advantageous that the plurality of array antenna elements are arranged so as to be bilaterally symmetrical with respect to the center of the receiving antenna.

ADVANTAGES OF THE INVENTION

According to the invention of claims 1 to 5, if the number of incoming waves, or targets, is two or less within an observation range (which is a radar scanning range or an angle of detection), no direction linearly dependent on the incoming wave, that is, undesired peak is caused. Thus, when the incoming waves are two or less, large undesired peaks can be prevented from being produced even when a subspace method, such as MUSIC, called high-resolution scheme is used.

In claims 2, 3 and 5, no undesired peak is produced up to an L number of incoming waves. In claim 2, when $L=L_{max}$, no undesired peak is produced up to a maximum number of incoming waves in the radar system. Thus, adverse effects of false images can be further avoided, whereby the radar system realizing arrangement of non-uniform array antennas can be presented with the realization of a wide-angle detection.

According to the invention of claim 6, in light of the spaces between non-uniform array antennas, grating lobes can be avoided.

According to the invention of claim 7, the arrangement of the array antenna elements can be advantageously facilitated because the greatest common divisor of inter-group element spaces can be made as small as possible.

According to the invention of claim 8, an amount of operation can be reduced for the increase of the speed, owing to the use of a unitary process in performing the azimuth detection operation.

It should be appreciated that numerals or the like in brackets expediently indicate corresponding elements in the drawings. Thus, the present description is not intended to be limited or restricted to the illustrations of the drawings.

BRIEF DESCRIPTION OF THE INVENTION

FIG. 2A is a block diagram illustrating an embodiment of an electronically scanned radar system of the present invention;

FIG. 2B is a schematic diagram illustrating details of the antenna;

FIG. 4 illustrates by (a) a non-uniform antenna array and an example of conditions for producing an undesired peak, and by (b) a desired peak corresponding to a target and false peaks (false images) that do not correspond to the target, both of which are observed through the antenna of (a);

Figure 1:
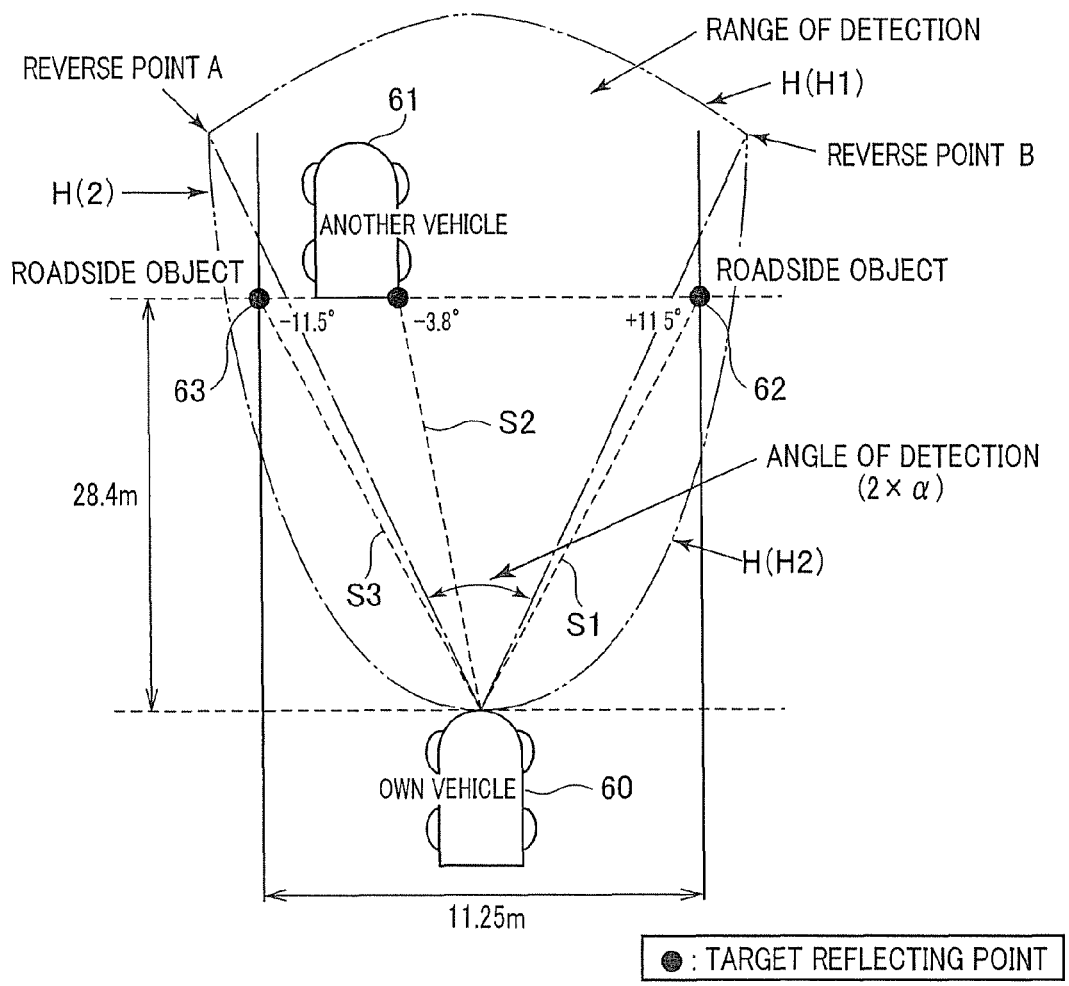
FIG. 1 is a plan view illustrating an example of detecting a forward target by a radar system.
Figure 6:
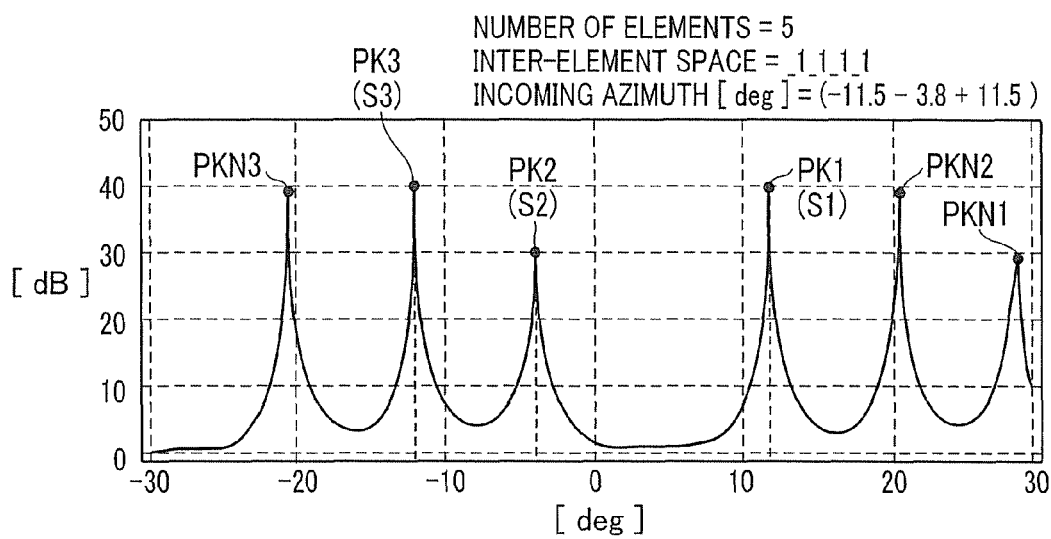
Figure 7:
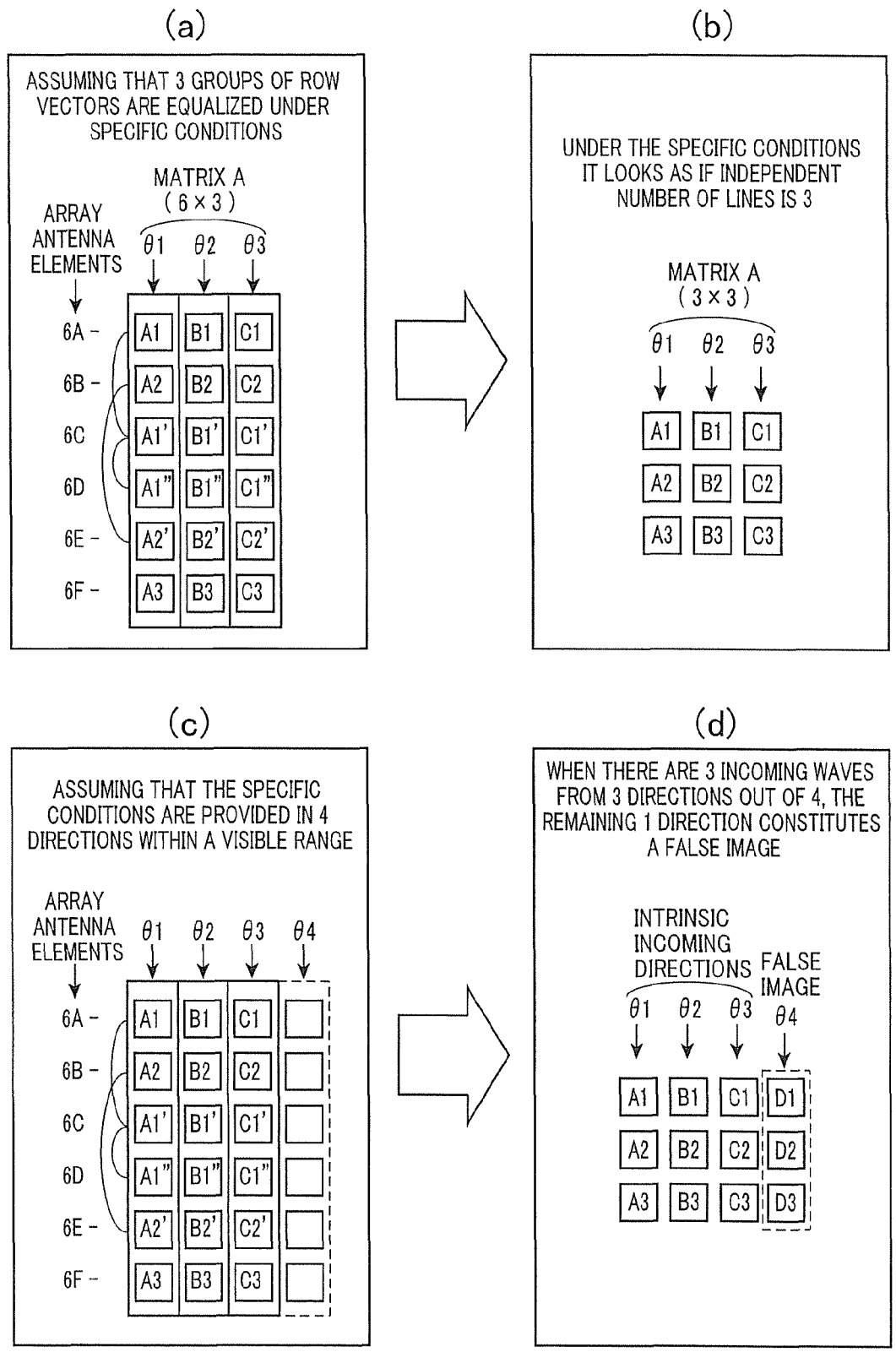

FIG. 6 illustrates an example of detection signals with undesired peaks being produced, the detection signals being received through a receiving array antenna using uniform array antenna elements, in the example of detection illustrated in FIG. 1; and FIG. 7 illustrates conditions of receiving signals using a high resolution scheme, such as MUSIC, for detection of a target in a receiving array antenna having six array antenna elements.

DESCRIPTION OF REFERENCE SYMBOLS

1 . . . Electronically scanned radar system
5 . . . Transmitting antenna
6 . . . Antenna elements
8 . . . Receiving array antenna
10 . . . Mixer
13 . . . A/D converter
17 . . . Target detection section
RX . . . Reception signal
TX . . . Transmission signal

BEST MODE FOR CARRYING OUT THE INVENTION

Referring to the drawings, hereinafter will be described some embodiments of the present invention.

FIG. 2A is a block diagram illustrating an electronically scanned radar system 1 according to an embodiment of the present invention. The radar system 1 is an FM-CW radar system using a transmission signal Tx which is obtained by applying frequency modulation (FM) to a continuous wave (CW). High resolution processing, such as MUSIC, is performed for the output of a receiving array antenna 8, by a target detection section 17 which will be described later. The radar system 1 is a so-called on-vehicle radar system loaded on a vehicle, which detects, for example, a distance to a vehicle (target) traveling ahead or a relative speed of the vehicle traveling ahead. The results of the detection of the radar system 1 are utilized, for example, for avoiding danger while the vehicle is traveling and for giving notification to the driver. Millimeter wave are used as transmission waves Tx.

The radar system 1 has a transmission section 4. The transmission section 4 includes an oscillator 2 having center frequency f0 (e.g., 76 GHz) and connected to a control signal generator 50, an amplifier 3 and a transmitting antenna 5. The oscillator 2 outputs a signal which is obtained by applying triangular wave modulation with a frequency modulation width AF, to a carrier wave having the frequency f0 by using control voltage outputted from a DC power source for modulation, not shown. That is, the oscillator 2 outputs a modulated wave (transmission wave Tx) at a frequency f0±ΔF/2. The modulated signal is amplified by the amplifier 3 and emitted as an electromagnetic wave from the transmitting antenna 5. The transmission waves Tx are partially outputted to a mixer 10 to serve as local signals for reception detection. In order to have the transmitting antenna 5 had desired horizontal directivity, the transmitting antenna 5 is made up of four element antennas, for example, not shown. The transmitting antenna 5 transmits the transmission signal Tx centering on the center of the transmitting antenna 5, that is, centering on a center CT2 of an own vehicle 60 to perform scanning in the horizontal direction covering a scanning range ARA whose minimum angle is $\theta_{min}$ and a maximum angle is $\theta_{max}$.

A receiving array antenna 8 provided at a reception section 20 has a K number of non-uniform linear array antenna elements 6 corresponding to channels from a first channel (#1) to a $K^{th}$ channel (#K). Each of the antenna elements 6 is made up of two component antennas (not shown) and, similar to the transmitting antenna 5, is permitted to have fixed horizontal directivity. As shown in FIG. 2B, the K number of array antenna elements 6 are spatially set as will be described later so as to have a space SPn (n=1 to k−1) between adjacent array antenna elements 6, 6.

Radio waves scatteringly reflected by a target are received by the respective antenna elements 6 as reception signals Rx. The received reception signals Rx are amplified by respective RF amplifiers 9 and mixed with distributed transmission waves Tx by respective mixers 10. Each of the reception signals Rx is down-converted by this mixing to produce a beat signal S3, that is, a differential signal resulting from the difference between the transmission signal Tx and the reception signal Rx. The technique for obtaining the beat signal S3 based on the reception signal RX and the transmission signal TX is well known as described, for example, in Japanese Patent Laid-Open No. 11-133142. Therefore, description on the detailed processes is omitted herein.

The produced beat signals S3 for the individual antenna elements 6 pass through respective low-pass filters 12 provided for the individual antenna elements 6, and are sampled and quantized, i.e. digitized, by respective A/D converters 13 at sampling frequency fs to provide an N number of sampled data for every snapshot. The digital signals are then stored in a buffer unit 14 for output to a target detection section 17.

As shown in FIG. 2, the target detection section 17 includes a beat frequency detection unit 31, an azimuth detection unit 33 and a pair-match detection unit 34. The beat frequency detection unit 31 calculates more than zero number of beat frequencies based on the digital signals from the buffer unit 14. The azimuth detection unit 33 detects a target azimuth for each of the calculated beat frequencies using a high-resolution scheme, such as MUSIC, known as a subspace method. The pair-match processing unit 34 performs processes of calculation on distance, azimuth and relative speed associated with the target, on the basis, for example, of the detected beat frequency and the results of the azimuth detection, and outputs the results of the calculation to a downstream processing unit, such as a target tracking unit, not shown. It should be appreciated that the processes performed in the target detection section 17 including the process of high-resolution scheme used in the azimuth detection unit 33, are based on a well-known technique. Therefore, the detailed explanation is omitted herein.

As already mentioned above, the plurality of array antenna elements 6 structuring the receiving antenna 8 are arranged with a space SPn (n=1 to k−1) for providing non-uniform spaces therebetween, so as to satisfy the requirements hereinafter explained. Before proceeding to the explanation, an explanation is given on the problems caused in the case where the high-resolution scheme (process), such as MUSIC, known as a subspace method is used in performing the target detection.

When the high-resolution scheme, such as MUSIC, known as a subspace method is used in performing the target detection in the target detection section 17, it is known that the linear dependency of a direction matrix made up of mode vectors is associated with the production of undesired peaks.

For example, undesired peaks may be produced when the receiving antenna 8 has received an L number of incoming waves, and when the vectors with directions where no target is present are caught in a span of mode vectors $\{a(\theta 1), a(\theta k) \ldots a(\theta L)\}$ where the mode vectors of the L number of incoming waves are stretched as follows.

$$a(\theta L) \in span\{a(\theta 1), a(\theta k) \ldots a(\theta L)\}$$

In other words, undesired peaks may be periodically produced when vectors corresponding to the mode vectors with directions where no target is present, or so-called false images, reside in the spaces defined by the L number of incoming waves that divide the angle of detection of the radar system 1.

The cause for allowing the mode vectors of plural azimuths to be linearly dependent may be associated with a greatest common divisor $D_{gcd}(G(L,p))$ of plural inter-group element spaces, each group consisting of the antenna elements 6.

The greatest common divisor $D_{gcd}(G(L,p))$ of inter-group element spaces can be defined as a greatest common divisor for a set $\{D_{gcd}(g1), \ldots, D_{gcd}(gk), \ldots, D_{gcd}(gL)\}$ having as components greatest common divisors of inter-element spaces included in individual groups of the antenna elements 6 that constitute the receiving antenna 8, the groups being obtained by using a specific grouping method $G(L,p)$.

A method introduced herein is based on an idea of dividing the receiving array antenna 8 into a plurality of groups in respect of the array antenna elements 6 constituting the receiving array antenna 8. Specifically, the idea is to divide the receiving array antenna 8 into two groups and to express the groups with $G(2, p)$.

This grouping is performed for all the combinations of the array antenna elements 6 constituting the receiving array antenna 8. Accordingly, the groups $G(2, p)$ to be divided into can be expressed as follows:

$$G(2,p) \equiv \{g1, g2\}$$

where p is the serial number designated to all the conceivable grouping methods, g1 and g2 are sets each consisting of the number of elements such that, for example, $g2=\{\#1, \#4, \#K\}$.

Figure 3:
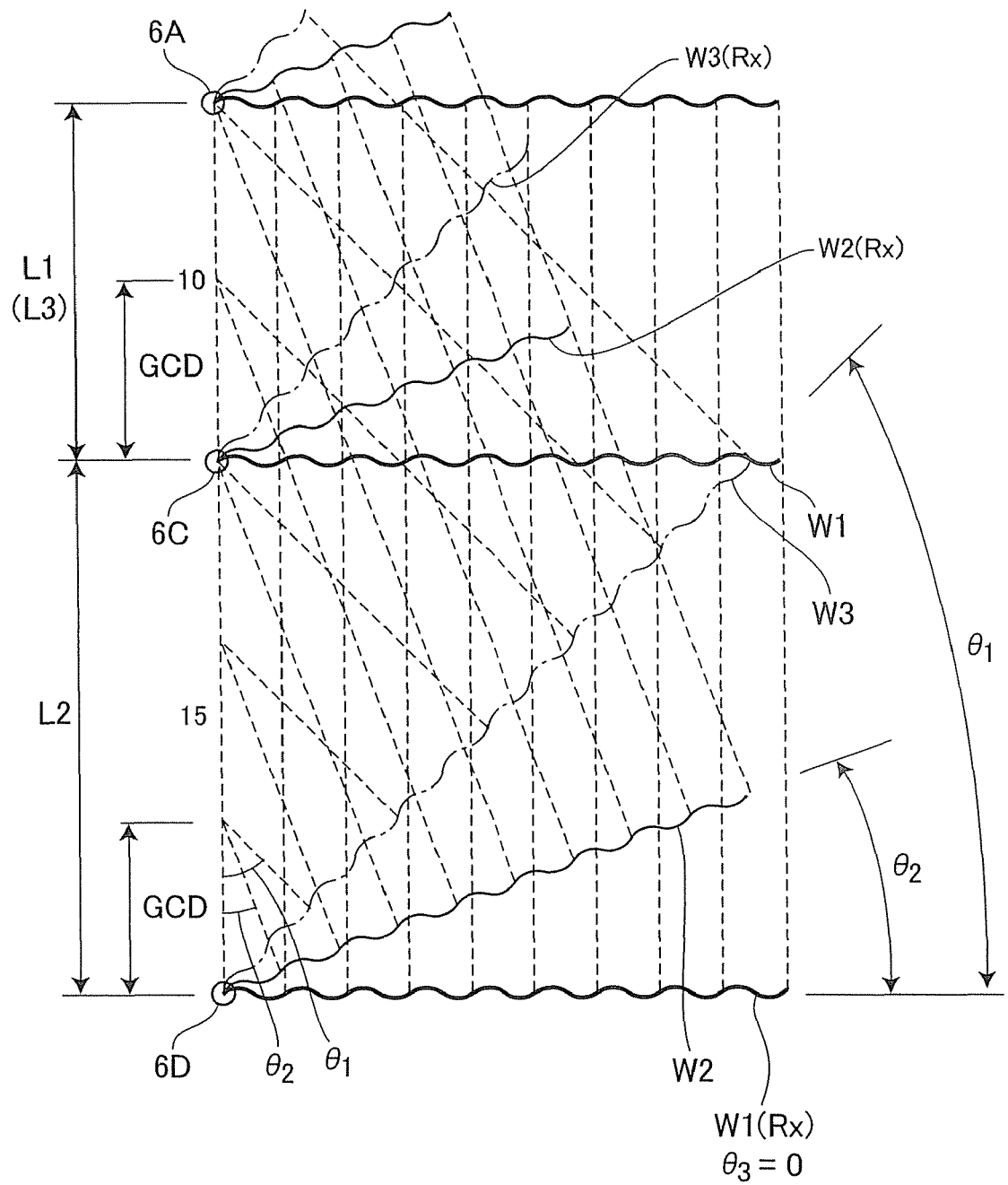
FIG. 3 illustrates an arrangement of antenna elements and a plurality of reflected waves entering the antenna elements.

Let us assume now that the receiving array antenna 8 is structured by six array antenna elements 6A to 6F, as shown by (a) of FIG. 7, and let us focus on the group consisting of three array antenna elements 6A, 6C and 6D. As shown in FIG. 3, in the waves constituting the reception signals Rx inputted to the three antenna elements 6, W1 is a wave having an entry angle 0 (zero=$\theta 3$), W3 is a wave having an entry angle $\theta 1$ and W2 is a wave having an entry angle $\theta 2$. Further, 6A and 6C, and 6C and 6D of the three array antenna elements have inter-element spaces L1 and L2, respectively, where L1=10 and L2=15. In this case, an assumption is made that the entry angles $\theta 1$ and $\theta 2$, and a greatest common divisor GCD of the spaces L1 and L2 of the adjacent antenna elements 6 in this antenna group, have predetermined values, or that GCD×sin $\theta 1$ and GCD×sin $\theta 2$ individually result in integral multiples of a wavelength $\lambda$ of the reception signals Rx. Then, the wave W1 having the entry angle 0 enters in-phase without delay for the antenna elements 6A, 6C and 6D. The wave W2 having the entry angle $\theta 2$ enters in-phase with a wavelength delay of just 2$\lambda$ between the antenna elements 6A and 6C, and enters in-phase with a wavelength delay of just 3$\lambda$ between the antenna elements 6C and 6D. The wave W3 having the entry angle $\theta 1$ enters in-phase with a wavelength delay of just 4$\lambda$ between the antenna elements 6A and 6C, and enters in-phase with a wavelength delay of just 6$\lambda$ between the antenna elements 6C and 6D.

Thus, the waves W1, W2 and W3 make an in-phase entry into the antenna elements 6 constituting the antenna group of array antenna elements 6A, 6C and 6D, with a wavelength delay of integral multiple of the wavelength $\lambda$. That is, the individual waves W1, W2 and W3 make an in-phase entry for the three antenna elements 6A, 6C and 6D. This means that the three antenna elements 6A, 6C and 6D are equivalent to a single antenna element 6 in the high-resolution scheme, such as MUSIC. As already described above, the antenna elements 6A, 6C and 6D are a part of the receiving array antenna 8 structured by the six array antenna elements 6. Accordingly, the receiving array antenna 8 is equivalent to the receiving array antenna 8 consisting of substantially four array antenna elements 6.

Similarly, as to the remaining two array antenna elements 6B and 6E, when the wavelength delay is an integral multiple of the wavelength $\lambda$ similar to the group explained above, the array antenna elements 6B and 6E are equivalent to a single antenna element 6 in the high-resolution scheme, such as MUSIC.

FIG. 7 schematically shows by (a) the conditions described above. In the figure, regarding the waves (e.g., W3) of the reception signals of the first row having the entry angle $\theta 1$, signals A1, A1' and A1" in the figure are the waves W3 that make an in-phase entry into the array antenna elements 6A, 6C and 6D constituting a first array antenna element group, with a delay of multiple wavelengths $\lambda$ from each other. Also, signals A2, A2' and A2" are the waves W3 of the reception signals that make an in-phase entry into the array antenna elements 6B and 6E constituting a second array antenna element group, with a delay of multiple wavelengths $\lambda$ from each other. A signal A3 is the wave W3 of the reception signal that makes an entry into the array antenna element 6F constituting a third array antenna element group. The phases of the signals A1, A2 and A3 of the waves W3 entering the groups of the array antenna elements are usually less than the wavelength $\lambda$ and are offset from each other by an arbitrary amount.

The same applies to the waves (e.g., W2) of the reception signals of the second row in the figure, having the entry angle $\theta 2$. Signals B1, B1' and B1" in the figure are the waves W2 that make an in-phase entry into the array antenna elements 6A, 6C and 6D constituting the first array antenna element group, with a delay of multiple wavelengths $\lambda$ from each other. Also, signals B2, B2' and B2" are the waves W2 of the reception signals that make an in-phase entry into the array antenna elements 6B, 6E and 6F constituting the second array antenna element group, with a delay of multiple wavelengths $\lambda$ from each other. A signal B3 is the wave W2 of the reception signal that makes an entry into the array antenna element 6F constituting the third array antenna element group. The phases of the signals B1, B2 and B3 of the waves W2 entering the groups of the array antenna elements are usually less than the wavelength λ and are offset from each other by a predetermined amount.

The same applies to the waves (e.g., W1) of the reception signals of the third row in the figure, having the entry angle θ3. Signals C1, C1' and C1" in the figure are the waves W1 that make an in-phase entry into the array antenna elements 6A, 6C and 6D constituting the first array antenna element group, with a delay (offset) of multiple wavelengths λ from each other. Also, signals C2, C2' and C2" are the waves W1 of the reception signals that make an in-phase entry into the array antenna elements 6B and 6E constituting the second array antenna element group, with a delay (offset) of multiple wavelengths λ from each other. A signal C3 is the wave W1 of the reception signal that makes an entry into the array antenna element 6F constituting the third array antenna element group. The phases of the signals C1, C2 and C3 of the waves W1 entering the groups of the array antenna elements are usually less than the integral wavelength λ and are offset from each other by a predetermined amount.

In terms of the direction matrix of the receiving array antenna 8, the direction matrix shown by (a) of FIG. 7 is equivalent to that shown by (b). Specifically, the direction matrix of the receiving array antenna is a 3×3 direction matrix which is made up of the first array antenna element group {6A, 6C, 6D}, the second antenna element group {6B, 6E} and the third array antenna element group {6F}.

Under such circumstances, assuming that another direction (e.g., entry angle θ4) satisfying the conditions is present within the observation range (radar scanning range), as shown by (c) of FIG. 7, mode vectors corresponding to this θ4 establish a linearly dependent relationship. Accordingly, when actual incoming waves (e.g., waves W1, W2 and W3) reside in any three directions (e.g., entry angles θ1, θ2 and θ3) out of the four directions, undesired peaks may be produced in the remaining one direction (e.g., entry angle θ4), as shown by (d) of FIG. 7, in spite of the absence of incoming waves.

The value of the greatest common divisor $D_{gcd}$ between the greatest common divisors of the groups of the array antenna elements varies depending on non-uniform space patterns. A pattern that makes this value large may cause conditions where the value obtained from the following formula exceeds the number of incoming waves L:

[Mathematical Expression 1]

$$\frac{D_{gcd}\sin(\theta_{max}) - D_{gcd}\sin(\theta_{min})}{\lambda} \quad (1)$$

(λ: a wavelength of a reception signal (incoming wave), $\theta_{max}$: a maximum angle of a transmission signal in a horizontal scanning range, and $\theta_{min}$: a minimum angle of a transmission signal in a horizontal scanning range). Under these conditions, at least one undesired peak may be produced. Specifically, when the angle of detection is evenly divided by the number of incoming waves L, a smaller production cycle of a false image, i.e. a smaller production cycle of undesired peak, than the evenly divided angle of detection, may constitute the conditions of linear dependency. As a result, as shown by (b) of FIG. 4, undesired peaks PKN may be produced.

Thus, in order to completely suppress the production of the undesired peaks using this principle, attention should be paid to the number of incoming waves L. Alternatively, as will be described later, attention should be paid on a maximum number of incoming waves $L_{max}$ specified in advance in a radar system.

In this regard, in the case where a receiving antenna is grouped into two, the undesired peaks can at least be prevented from being produced if the number of incoming waves as received is two or less, or if the maximum number of waves is specified to two in the radar system.

Specifically, let us take as an example the receiving array antenna 8 structured by five array antenna elements 6, as shown by (a) of FIG. 4. In this example, a space 8 U (U is a basic unit which may be 1 mm, for example) is provided between channels #1 and #2, a space 2 U, between channels #2 and #3, a space 3 U, between channels #3 and #4, and a space U5, between channels #4 and #5 of the array antenna.

Example 1 is explained, in which the five array antennas are grouped into two. A first group of the array antennas in Example 1 consists of channels #2, #4 and #5, and a second group consists of channels #1 and #3. In this case, in the first group, the space between the channels #2 and #4 is 5 U, the space between the channels #2 and #5 is 10 U, and the space between the channels #4 and #5 is 5 U. Thus, the greatest common divisor is 5 U for the inter-element spaces of the first group. In the second group, since the space between the channels #1 and #3 is 10 U, the greatest common divisor is 10 U for the inter-element spaces of the second group. Accordingly, the greatest common divisor of the inter-group element spaces in Example 1, i.e. the greatest common divisor between 5 U and 10 U, is 5 U. When 5 U is equal to or greater than three wavelengths, false images, or grating lobes, may be caused.

In Example 2 explained below, these five array antennas are also grouped into two but in a different manner from that of Example 1. A first group of the array antennas in Example 2 consists of the channels #1, #2 and #3, and a second group consists of the channels #4 and #5. In this case, in the first group, the space between the channels #1 and #2 is 8 U, the space between the channels #1 and #3 is 10 U, and the space between the channels #2 and #3 is 2 U. Accordingly, the greatest common divisor of the inter-element spaces of the first group is 2 U. In the second group, since the space between the channels #4 and #5 is 5 U, the greatest common divisor of the inter-element spaces is 5 U. Accordingly, the greatest common divisor of the inter-group element spaces in Example 2, i.e. the greatest common divisor of 2 U and 5 U, is 1 U.

In Example 3 explained below, the five array antennas are again grouped into two but in a different manner from that of Example 1. A first group of the array antennas in Example 3 consists of the channels #1, #2, #3 and #4, and a second group consists of only the channel #5. In this grouping, the greatest common divisor of the inter-element spaces in the first group is 1 U. Particularly, studying that the space between the channels #1 and #2 is 8 U, the space between the channels #1 and #3 is 10 U, the space between the channels #1 and #4 is 13 U, the space between the channels #2 and #3 is 2 U, the space between the channels #2 and #4 is 5 U, etc., the greatest common divisor of the inter-element spaces of the first group is 1 U. The greatest common divisor of the inter-element spaces of the second group consisting of only the channel #5 is regarded as being zero. In this case, the greatest common divisor of the inter-group element spaces in Example 2, i.e. the greatest common divisor of 1 U and zero, is 1 U.

In Examples 1, 2 and 3 explained above, the maximum value of the greatest common divisor of the inter-group element spaces is 5 U. In this regard, the spaces between the array antenna elements 6 are determined so that an obtained greatest common divisor of the inter-group element spaces does not exceed the value obtained from the following Formula (3). Thus, the false images (undesired peaks) PKN can be prevented from occurring within the angle of detection.

[Mathematical Expression 2]

$$\frac{2 \times \lambda}{\sin(\theta_{max}) - \sin(\theta_{min})} \quad (3)$$

It should be appreciated that the relationship between sin ($\theta_{max}$) and sin($\theta_{min}$) is most commonly ±α° centering on 0°. The value of α herein is more than a predetermined value which is of a degree for allowing the transmission energy of the transmission waves of the radar system 1 to detect a target. For example, referring to FIG. 1, the transmission wave from the radar system 1 of the own vehicle has the transmission energy as indicated by a dashed-two dotted line H. Also, reverse points A and B reside in the intersections between a dashed-two dotted line H1 on the front side of the own vehicle and dashed-two dotted line H2 on the lateral sides of the own vehicle. In this case, the angle obtained by connecting the reverse points A and B with the transmission section 5 of the own vehicle radar system 1 may be the angle of detection. Specifically, in the case shown in FIG. 1, the angle of detection equals to bilaterally symmetrical angles α, i.e. 2×α, with respect to the center of transmission, i.e. 0°, of the transmission waves of the radar. In a uniform array antenna, the following relationship can be established:

$\theta_{max} \approx \pm \arcsin(\lambda/2d)$ (where d is the space in the uniform array antenna). In a non-uniform array antenna, application of the largest space from among the non-uniform spaces to d can obtain a value sufficiently usable as $\theta_{max}$.

Only three examples have been introduced herein for grouping receiving antennas into two. In practice, however, there are further plural ways of grouping the antennas into two. The same calculation as mentioned above can be performed for all of the ways of grouping on the basis of Formula (2) to obtain greatest common divisors of inter-group element spaces for the individual groupings. The greatest common divisors of inter-group element spaces obtained in all of the groupings are ensured to be smaller than the value obtained by Formula (3).

Not only the greatest common divisor of inter-group element spaces but also the greatest common divisor of the spaces between the array antenna elements 6 per se is required not to exceed the value determined by Formula (4), whereby production of the grating lobes can be suppressed.

[Mathematical Expression 3]

$$\frac{\lambda}{\sin(\theta_{max}) - (\sin(\theta_{min}))} \quad (4)$$

Figure 5:
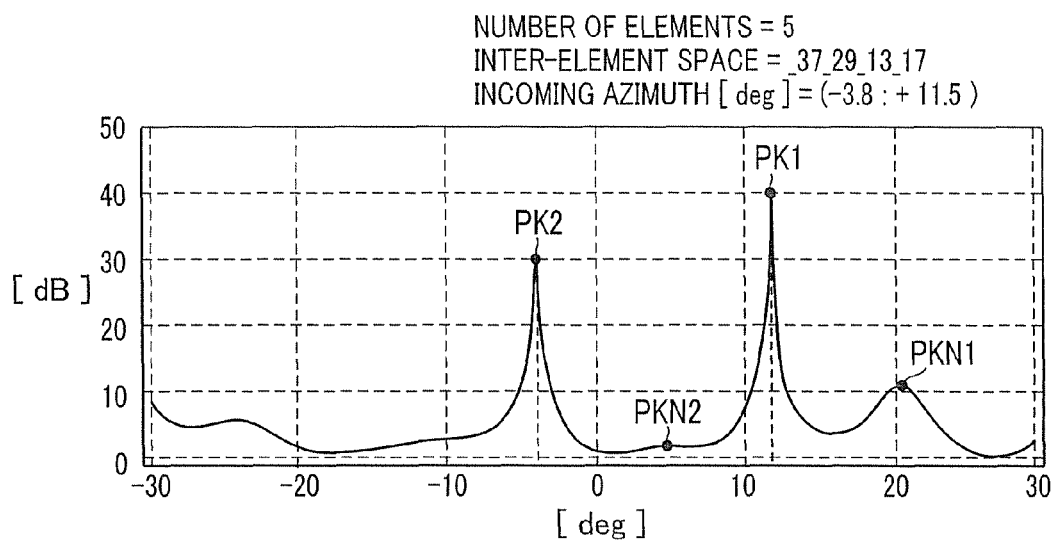
FIG. 5 illustrates a desired peak corresponding to a target and false peaks (false images) that do not correspond to the target, both of which are observed through the non-uniform antenna array of the present invention.

FIG. 5 shows by (a) an example of peaks in a wave, which correspond to a target or a false image in the case where the five array antenna elements 6 in the example shown in FIG. 2B have a space SPK inbetween, i.e. SPK-1=37, SPK-2=29, SPK-3=13 and SPK-4=17. FIG. 5 shows by (a) a waveform detected by a non-uniform array antenna to which the present embodiment is applied, in a relationship similar to the azimuth relationship, as shown in FIG. 1, between the vehicle 60 equipped with the radar system 1 and the incoming waves of the targets 61 and 62 excepting the target 63.

As can be seen from FIG. 5, both peaks PKN1 and PKN2 corresponding to grating lobes are at low levels, relative to peak PK1 corresponding to a reflected wave S1 of the target 61 and peak PK2 corresponding to a reflected wave S2 of the target 62. Also, no undesired peaks corresponding to false images can be seen.

Specifically, owing to the method described above, an arrangement of non-uniform array antenna has been realized, by which a cycle of producing false image, or a cycle of producing an undesired peak, can be made larger than a regional range angle obtained by dividing the angle of detection (radar scanning range) into two. Thus, the peaks of frequency spectrum corresponding to targets are produced for only up to two directions. Accordingly, even when the high-resolution scheme called subspace method, such as MUSIC, is used, production of large undesired peaks can be avoided in the state where two or less targets are recognized.

As described above, use of the receiving array antenna having inter-element spaces according to the present invention, can realize a low-cost radar system which is able to balance the high resolution performance and wide-angle performance, while reducing the number of elements.

In FIG. 2B, for example, the arrangement of the plurality of array antenna elements 6 constituting the receiving array antenna 8 may be bilaterally symmetrical centered on a center CT of the receiving array antenna 8. This arrangement may allow use of a unitary process in the azimuth detection operation using the high-resolution scheme in the azimuth detection unit 33. This can help reduce the amount of operation to thereby enable high-speed processing.

Alternatively, the configuration may be such that the spaces between the array antenna elements 6 have a prime number ratio when optionally reordered. This may advantageously reduce the greatest common divisor $D_{gcd}$ of inter-group element spaces as much as possible, even when a ratio of the spaces between the antenna elements is set to a relatively small integer.

The embodiment described above has an idea of dividing the angle of detection into two in the case where the number of incoming waves for the radar system 1 is two or less, so that production of grating lobes and undesired peaks can be suppressed.

Let us assume that the number of incoming waves L of the receiving array antenna 8 is three in the embodiment described above. With L=3 being constituted, the five array antenna elements 6 may be grouped into three as indicated by Example 4 of (a) of FIG. 4. For example, the array antenna elements 6 may be grouped into a first group of the channels #2, #4 and #5 of the array antenna elements 6, a second group of the channel #1 of the array antenna elements 6, and a third group of the channel #3 of the array antenna elements 6. Then, the greatest common divisors GCD of the individual groups may be obtained.

In the case of (a) of FIG. 4, the greatest common divisor GCD of the first group is 5 U, the greatest common divisor GCD of the second group is 0, and the greatest common divisor GCD of the third group is 0. Subsequently, a set {5 U, 0 U, 0 U} can be obtained, having as components the greatest common divisors of the inter-element spaces included in the individual groups, followed by obtaining a greatest common divisor GCD for the set as a greatest common divisor of inter-group element spaces. In the case of FIG. 4, the greatest common divisor of inter-group element spaces is 5 U.

In this case, 5 U may exceed a wavelength λ by a factor of three (=L). Specifically, the cycle of producing a false image (cycle of producing an undesired peak) may be smaller than one third of the angle of detection, which is an angle between $\theta_{max}$ and $\theta_{min}$, or may be smaller than one $L^{th}$ of the angle of detection. In such a case, the conditions of linear dependency are established to produce the false images (undesired peaks) PKN within the observed range, as shown by (b) of FIG. 4. In this way, when grouping used in terms of the greatest common divisor of inter-group element spaces is rendered to be two, as in the embodiment described above, undesired peaks, or false images, may be produced if the number of incoming waves is three or more.

Therefore, production of the undesired peaks may be ensured to be suppressed in response to the number of incoming waves. Specifically, when the radar system 1 recognizes three or four targets, the angle of detection may be ensured to be divided in response to the number of targets, i.e. the number of incoming waves, which number is recognized by the radar system 1. Under this condition, the embodiment described above has allowed production of the undesired peaks. It should be appreciated that the number of targets under recognition may alternatively ensured to be recognized using the results of target detection conducted by an image sensor which is mostly used for a pre-crash control system for vehicle separately from the radar system 1. In this case, a value determined by Formula (4) is ensured not to exceed the greatest common divisor of the inter-group element spaces:

[Mathematical Expression 4]

$$\frac{\lambda}{\sin(\theta_{max}) - \sin(\theta_{min})} \times L \qquad (4)$$

where L is the number of targets, or the number of waves, to be recognized by the current radar system 1. In this case, the inter-element spaces of the receiving antenna that is a non-uniform array antenna are divided into 1 to L in terms of a set G(L, P), in which one or more antenna elements are included in one group.

$$G(L,P) = \{g1, \ldots gl \ldots gL\}$$

(where p is a serial number designated to all the conceivable grouping methods, and l is the number designated to each of the divided groups, that is, l=1 ... L, e.g. g1 is a set of the element numbers included in a first group, e.g. {#1, #4, #5}). In this case, the greatest common divisor of a set of $\{D_{ged}(g1), \ldots D_{ged}(gl), \ldots D_{ged}(gL)\}$ is rendered to be the greatest common divisor of the inter-group element spaces, in which the components are the greatest common divisors of the inter-element spaces included in individual groups gl divided in terms of G(L, P).

In this way, if Formula (5) is satisfied in response to the number of targets, or the number of waves L:

[Mathematical Expression 5]

$$\frac{D_{gcd}\sin(\theta_{max}) - D_{gcd}\sin(\theta_{min})}{L} > \lambda \qquad (5)$$

(where $D_{ged}$ indicates a greatest common divisor of inter-group element spaces), not only the grating lobes but also the undesired peaks can be prevented from being produced. In other words, a non-uniform array antenna may only be arranged so that the angle range resulting from the division of the angle of detection by the number of incoming waves L becomes larger than $\lambda/D_{ged}$ which is the cycle of production of the undesired peak.

The number of incoming waves L never exceeds the maximum number of incoming waves $L_{max}$. Taking this maximum number of incoming waves $L_{max}$ into consideration, no undesired peak is produced, irrespective of the number of incoming waves. It should be appreciated that the maximum number of incoming waves $L_{max}$ is the maximum number of targets recognized by the radar system 1, and is determined as a preset value of the radar system 1. However, only the value up to one less than the number of the non-uniform array antennas 6 can be physically preset as $L_{max}$ and recognized as targets. For example, as shown in FIG. 2B, when there are six array antennas 6, five targets can maximally be recognized, allowing values of 1 to 5 to be used as the maximum number of incoming waves $L_{max}$.

If the undesired peaks up to the maximum number of incoming waves $L_{max}$ are to be suppressed from being produced, the spaces between the non-uniform array antennas may be determined so as to satisfy the following formula:

[Mathematical Expression 6]

$$\frac{\lambda}{\sin(\theta_{max}) - \sin(\theta_{min})} L_{max} < D_{ged} \qquad (6)$$

where L of G(L, P) is 1 to $L_{max}$. The greatest common divisor of inter-group element spaces may be the greatest common divisor derived from a set $\{G_{ged}(g1), \ldots D_{ged}(gl), \ldots D_{ged}(gL_{max})\}$ having as components the greatest common divisors of inter-element spaces of individual groups gl that have been divided in terms of G(L, P).

In other words, the number of groups L constituting the set is changed. Then, as to all the numbers L equal to or less than the maximum number of incoming waves $L_{max}$, the greatest common divisors $G_{gcd}(G(L,p))$ of inter-group element spaces are calculated. The spaces between the individual array antenna elements are then set so that each greatest common divisor of the inter-group element spaces does not exceed the value determined by Formula (3), whereby the spaces may not cause directions linearly dependent on the L number of incoming waves in the radar scanning region. Then, as shown in FIG. 5, in terms of design, false images (undesired peaks PKN) of the number exceeding the number of the incoming waves can be effectively prevented from being produced in the observation range (radar scanning range), as to all the numbers L equal to or less than the maximum number of incoming waves $L_{max}$.

It should be appreciated that the maximum number of incoming waves $L_{max}$ is a preset value (generally, equal to or less than the number of array antenna elements constituting the receiving array antenna) which is set in terms of design. As already mentioned, L may by any value (e.g., two as mentioned above) if only it is equal to or less than the maximum number of incoming waves $L_{max}$.

When L in Mathematical Expression 5 is an optionally selected integer from 1 to $L_{max}$, not only grating lobes but also undesired peaks can be prevented from being produced in respect of the number of targets up to the optional integer.

INDUSTRIAL APPLICABILITY

The present invention can be utilized for the on-vehicle electronically scanned radar system.

What is claimed is:

1. An electronically scanned radar system comprising:
a transmitting antenna which is able to freely transmit a transmission signal constituted of a continuous wave in a manner of performing horizontal scanning in a radar scanning region having a minimum angle $\theta_{min}$ and a maximum angle $\theta_{max}$;
a receiving antenna constituted of a plurality of array antenna elements which are arranged with predetermined spaces therebetween;
mixers for mixing reception signals received by the respective receiving array antenna elements with the transmission signals to obtain beat signals;
A/D converters for converting the beat signals of individual channels, which beat signals are obtained by the respective mixers, into digital signals; and
a target detection section for detecting a distance to or/and a relative speed of a target on the basis of the reception data, which are the signals digitized by the A/D converter, characterized in that:
spaces in the arrangement, i.e. non-uniform spaces, of the plurality of array antenna elements of the receiving array antenna are determined by:
(1) grouping the array antenna elements into two, to express a set encompassing the groups by G(2,p) (where p is a serial number designated to all the conceivable grouping methods);
(2) performing the grouping for every combination of the array antenna elements constituting the receiving array antenna;
(3) obtaining a greatest common divisor as a greatest common divisor $G_{gcd}$ of inter-group element spaces, for a set $\{D_{gcd}(1),D_{gcd}(2)\}$ that has, as components, greatest common divisors of inter-element spaces included in individual groups constituting each set G(2,p); and
(4) allowing the greatest common divisor $D_{gcd}$ of inter-group element spaces not to exceed the following formula:

[Mathematical Expression 2]

$$\frac{2 \times \lambda}{\sin(\theta_{max}) - \sin(\theta_{min})}$$

($\lambda$: a wavelength of a reception signal (incoming wave), $\theta_{max}$: a maximum angle of a transmission signal in a horizontal scanning range, and $\theta_{min}$: a minimum angle of a transmission signal in a horizontal scanning range).

2. The electronically scanned radar system according to claim 1, wherein the spaces between the plurality of array antenna elements are set so as to have a prime number ratio when optionally rearranged.

3. The electronically scanned radar system according to claim 1, wherein the plurality of array antenna elements are arranged so as to be bilaterally symmetrical with respect to the center of the receiving antenna.

4. An electronically scanned radar system comprising:
a transmitting antenna which is able to freely transmit a transmission signal constituted of a continuous wave in a manner of performing horizontal scanning in a radar scanning region having a minimum angle $\theta_{min}$ and a maximum angle $\theta_{max}$;
a receiving antenna constituted of a plurality of array antenna elements which are arranged with predetermined spaces therebetween, the receiving antenna being preset with a predetermined number of maximum incoming waves;
mixers for mixing reception signals received by the respective receiving array antenna elements with the transmission signals to obtain beat signals;
A/D converters for sampling the beat signals of individual channels, which beat signals are obtained by the respective mixers, at a predetermined sampling frequency to obtain reception data;
a target detection section for detecting a distance to or/and a relative speed of a target using a high-resolution scheme, on the basis of the reception data, which are the data sampled by the A/D converter, characterized in that:
spaces in the arrangement, i.e. non-uniform spaces, of the plurality of array antenna elements of the receiving array antenna are determined by:
(1) grouping the array antenna elements into a predetermined optionally selected natural number L, in respect of the maximum number of incoming waves $L_{max}$ of the receiving array antenna, the natural number being equal to or less than the maximum number of incoming waves $L_{max}$, to express a set of the groups with G(L,p);
(2) performing the grouping for every combination of the array antenna elements constituting the receiving array antenna to obtain a set expressed by:

$$G(L,p) \equiv \{g1, \ldots, gk, \ldots gL\}$$

(where p is a serial number designated to all the conceivable grouping methods, k is a number designated to each of the groups resulting from the grouping, which is expressed by k=1 . . . , gk is a set of element numbers included in a $k^{th}$ group);
(3) obtaining a greatest common divisor as a greatest common divisor $D_{gcd}(G(L,p))$ of inter-group element spaces, for a set $\{D_{gcd}(g1), \ldots D_{gcd}(gk), \ldots, D_{gcd}(gL)\}$ that has, as components, greatest common divisors of inter-element spaces included in individual groups gk constituting each set G(L,p); and
(4) obtaining the greatest common divisor $D_{gcd}(G(L,p))$ of inter-group element spaces for each of the optionally selected natural numbers L, and allowing the greatest common divisor $D_{gcd}(G(L,p))$ of inter-group element spaces not to exceed the following formula:

[Mathematical Expression 4]

$$\frac{\lambda}{\sin(\theta_{max}) - \sin(\theta_{min})} \times L$$

($\lambda$: a wavelength of a reception signal (incoming wave), $\theta_{max}$: a maximum angle of a transmission signal in a horizontal scanning range, $\theta_{min}$: a minimum angle of a transmission signal in a horizontal scanning range, and L: the number of groups corresponding to a greatest common divisor of inter-group element spaces).

5. The electronically scanned radar system according to claim 4, wherein the spaces between the plurality of array antenna elements are set so as to have a prime number ratio when optionally rearranged.

6. The electronically scanned radar system according to claim 4, wherein the plurality of array antenna elements are arranged so as to be bilaterally symmetrical with respect to the center of the receiving antenna.

7. An electronically scanned radar system loaded on a vehicle, comprising:
- a transmitting antenna which is able to freely transmit a transmission signal constituted of a continuous wave in a manner of performing horizontal scanning in a radar scanning region having a minimum angle $\theta_{min}$ and a maximum angle $\theta_{max}$; and
- a receiving antenna constituted of a plurality of array antenna elements which are arranged with predetermined non-uniform spaces therebetween;
- wherein signals are processed using a high-resolution scheme for reception signals received by the array antenna elements, to detect a distance to a target around an own vehicle or/and a relative speed between the own vehicle and the target, characterized in that:
- in the receiving antenna, the spaces in the arrangement of the plurality of array antenna elements constituting the receiving array antenna are determined by:
  (1) grouping the array antenna elements into the number of incoming waves L (L is two or more) toward the receiving array antenna, to express a set of the groups with G(L,p);
  (2) performing the grouping for every combination of the array antenna elements constituting the receiving array antenna to obtain a set expressed by:

G(L,p)≡{g1, ... , gk, ... gL}

(where p is a serial number designated to all the conceivable grouping methods, k is a number designated to each of the groups resulting from the grouping, which is expressed by k=1 ... , gk is a set of element numbers included in a $k^{th}$ group);
  (3) obtaining a greatest common divisor as a greatest common divisor $D_{gcd}(G(L,p))$ of inter-group element spaces, for a set $\{D_{gcd}(g1), ... D_{gcd}(gk), ..., D_{gcd}(gL)\}$ that has, as components, greatest common divisors of inter-element spaces included in individual groups gk constituting each set G(L,p); and
  (4) obtaining the greatest common divisor $D_{gcd}(G(L,p))$ of inter-group element spaces for each of the optionally selected natural numbers L, and allowing the greatest common divisor $D_{gcd}(G(L,p))$ of inter-group element spaces not to exceed the following formula:

[Mathematical Expression 4]

$$\frac{\lambda}{\sin(\theta_{max}) - \sin(\theta_{min})} \times L$$

($\lambda$: a wavelength of a reception signal (incoming wave), $\theta_{max}$: a maximum angle of a transmission signal in a horizontal scanning range, and $\theta_{min}$: a minimum angle of a transmission signal in a horizontal scanning and range).

8. The electronically scanned radar system according to claim 7, wherein the spaces between the plurality or array antenna elementa are set so as to have a prime number ratio when optionally rearranged.

9. The electronically scanned radar system according to claim 7, wherein the plurality of array antenna elements are arranged so as to be bilaterally symmetrical with respect to the center of the receiving antenna.

10. An electronically scanned radar system loaded on a vehicle, comprising:
- a transmitting antenna which is able to freely transmit a transmission signal constituted of a continuous wave in a manner of performing horizontal scanning in an angle of detection having a minimum angle and a maximum angle;
- a receiving antenna constituted of a plurality of array antenna elements which are arranged with predetermined spaces therebetween;
- mixers for mixing reception signals received by the respective receiving array antenna elements with the transmission signals to obtain beat signals;
- A/D converters for sampling the beat signals of individual channels, which beat signals are obtained by the respective mixers, at a predetermined sampling frequency to obtain reception data; and
- a target detection section for detecting a distance to or/and a relative speed of a target using a high-resolution scheme, on the basis of the reception data, which are the data sampled by the A/D converter, characterized in that:
- non-uniform spaces in the arrangement of the plurality of array antenna elements of the receiving array antenna are determined by:
- allowing a greatest common divisor of the spaces between the plurality of array antenna elements to be smaller than a wavelength of the reception signal;
- obtaining, when the plurality of array antenna elements are grouped in terms of a set constituted of two groups, greatest common divisors of inter-group element spaces with respect to all the groupings, each greatest common divisor of inter-group element spaces being a greatest common divisor of the set having as components greatest common divisors of inter-element spaces for each of two groups constituting the set; and
- allowing a direction not to be caused in the angle of detection, which direction is linearly dependent on an incoming wave corresponding to the greatest common divisor of inter-group element spaces.

11. The electronically scanned radar system according to claim 10, wherein the spaces between the plurality or array antenna elementa are set so as to have a prime number ratio when optionally rearranged.

12. The electronically scanned radar system according to claim 10, wherein the plurality of array antenna elements are arranged so as to be bilaterally symmetrical with respect to the center of the receiving antenna.

13. An electronically scanned radar system loaded on a vehicle, comprising:
- a transmitting antenna which is able to freely transmit a transmission signal constituted of a continuous wave in a manner of performing horizontal scanning in an angle of detection having a predetermined minimum angle and maximum angle; and
- a receiving antenna constituted of a plurality of array antenna elements which are arranged with predetermined non-uniform spaces therebetween;
- wherein signals are processed using a high-resolution scheme for reception signals received by the array antenna elements, to detect a distance to a target around an own vehicle or/and a relative speed between the own vehicle and the target, characterized in that:
- in an arrangement of the plurality of array antenna elements of the receiving antenna, the spaces in the receiving antenna are determined by:
- obtaining a greatest common divisor of inter-group element spaces as to all groupings
- obtaining, when the plurality of array antenna elements are grouped in terms of a set constituted of an L number of groups corresponding to an L number of incoming waves, greatest common divisors of inter-group element spaces with respect to all the groupings, each greatest common divisor of inter-group element spaces being a greatest common divisor of the set having, as components, greatest common divisors of inter-element spaces for the L number of groups constituting the set; and allowing the greatest common divisor of inter-group element spaces not to exceed L times of a wavelength of the reception signal to prevent production of a false image within each of the angles obtained by dividing the angle of detection into the L number.

14. The electronically scanned radar system according to claim 13, characterized in that the set of groups is obtained for every case where L is an integer value of 1 to L to obtain the greatest common divisor of inter-group element spaces based on the greatest common divisors of each of all the sets of groups.

15. The electronically scanned radar system according to claim 13, wherein the spaces between the plurality or array antenna elementa are set so as to have a prime number ratio when optionally rearranged.

16. The electronically scanned radar system according to claim 13, wherein the plurality of array antenna elements are arranged so as to be bilaterally symmetrical with respect to the center of the receiving antenna.

17. The electronically scanned radar system according to claim 14, wherein the spaces between the plurality or array antenna elementa are set so as to have a prime number ratio when optionally rearranged.

18. The electronically scanned radar system according to claim 14, wherein the plurality of array antenna elements are arranged so as to be bilaterally symmetrical with respect to the center of the receiving antenna.

* * * * *

UNITED STATES PATENT AND TRADEMARK OFFICE
CERTIFICATE OF CORRECTION

| | | |
|---|---|---|
| PATENT NO. | : 7,898,465 B2 | Page 1 of 1 |
| APPLICATION NO. | : 12/524672 | |
| DATED | : March 1, 2011 | |
| INVENTOR(S) | : Chiharu Yamano et al. | |

It is certified that error appears in the above-identified patent and that said Letters Patent is hereby corrected as shown below:

Col. 19, line 58, claim 8, "elementa" should be -- elements --

Col. 20, line 38, claim 11, "elementa" should be -- elements --

Col. 22, line 3, claim 15, "elementa" should be -- elements --

Col. 22, line 11, claim 17, "elementa" should be -- elements --

Signed and Sealed this
Thirteenth Day of March, 2012

David J. Kappos
*Director of the United States Patent and Trademark Office*